Jan. 12, 1937.   R. ETZKORN ET AL   2,067,522
METHOD OF PRODUCING CELLULOSIC FILMS
Filed Aug. 26, 1933
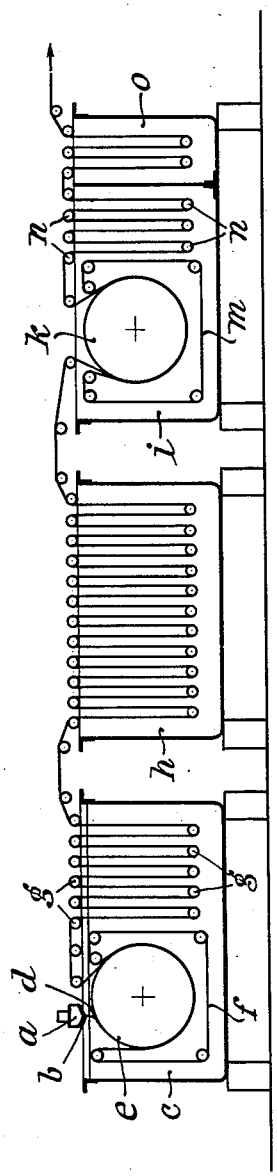
WITNESS
G. V. Rasmussen
INVENTORS
RUDOLF ETZKORN
EWALD KNEHE
BY
ATTORNEYS Patented Jan. 12, 1937

2,067,522

UNITED STATES PATENT OFFICE 2,067,522

METHOD OF PRODUCING CELLULOSIC FILMS

Rudolf Etzkorn and Ewald Knehe, Wuppertal-Barmen, Germany, assignors to firm I. P. Bemberg Aktiengesellschaft, Wuppertal-Oberbarmen, Germany, a corporation of Germany Application August 26, 1933, Serial No. 687,001
In Germany September 3, 1932

11 Claims. (Cl. 18—57)

The present invention relates to a process for the production of thin films from copper oxide ammonia cellulose solution, and to the product manufactured by this process.

It is the object of this invention to provide a method of making thinner the freshly spun foils obtained by squirting out a cuprammonium cellulose solution by longitudinal stretching before complete coagulation has taken place, and by avoiding thickening of the film by transverse shrinkage during the after treatment.

Further objects of the invention will become apparent from a perusal of the following description and the drawing in which is diagrammatically shown in cross section an apparatus for carrying out the process in practice.

There is a need for an extremely thin, absolutely transparent cellulose hydrate foil possessing only an extremely small weight per square meter. The finest cellulose hydrate foils now on the market have a thickness of a minimum of 0.02 mm. and consequently a weight per square meter of 30 grams. The other brands have a considerably greater weight. For manifold purposes, however, this thickness of the foil has proved to be much too high and accordingly unusable for the purposes in view, especially as the finest gauge sheets heretofore made have been manufactured from viscose and have only a comparatively small degree of toughness.

Thus, there exists a demand for extremely fine cellulose hydrate foils, for example for the spinning or binding of bast strips in the manufacture of hat material. For the spinning of the cellulosic material about the bast fibres, the fine cellulose hydrate films are cut up into narrow strips and then wound about the bast strips. After these operations, the so-prepared material is braided or interwoven into a hat. Instead of bast strips, there can be employed also hemp threads, straw, or horsehair. By winding the cellulose hydrate films thereabout, the bast strips, etc. produce an especially brilliant effect. Furthermore, the strength and also the waterproofness of the material are increased. The finest, thinnest cellulose hydrate foils used heretofore, even of a weight of only 30 grams per square meter, burden the bound hemp far too much and the flexibility is too slight. In the other uses of cellulose hydrate foils it is a question of covering and lining objects of an uneven surface in such a manner that the contours can be apparent through the cellulose hydrate. For these purposes even the thinnest cellulose hydrate foils made heretofore are not utilizible, because they are too thick, too stiff, too glass-like and too little plastic.

The most diverse ways have been tried in order to produce a film from cellulose hydrate which is extremely fine, clear as glass and much finer than the finest gauges produced up to now. Particularly the methods applied heretofore in the industry of working up viscose with or without the use of a pouring base did not lead to the goal nor to any usable product.

It has now been found that it is possible to produce extremely fine cellulose hydrate foils by extruding cuprammonium cellulose solution according to the squirting process out of narrow slits of 0.05 to 0.5 mm. width of slit and the nap is drawn off by means of delivery rollers through a coagulating or precipitating bath of diluted soda lye and, if desired, stretched to the required fineness, and the structure then by suitable rotating transport devices conducted through the necessary aftertreatment baths for washing, acidifying and loading with glycerine, and if necessary then dried in a manner known per se over a system of drying cylinders and finally the thus obtained film is sub-divided in the desired way directly or after previous winding.

Tests have proved that it is preferable not to allow the so-called pourer or hopper to dip into the precipitating bath. The reason for this is to be found in coagulation on the pouring slit, which can lead to stopping up the slit.

Now in order to remedy the defects spoken of and to effectuate a proper precipitation of the film coming from the slit, the film is conducted through a stretch of air measuring a few millimeters and thereupon through a free bath passage measuring several centimeters and then the film is allowed to run inside the bath on to a drum of comparatively large circumference, which by adhesion prevents film, as it solidifies into a film, from shrinking transversely and thereupon the film is passed for further treatment to the subsequent transport elements.

The stretch of air is chosen best as small as possible. It has been found that a distance of 1 to 10 millimeters between the slit and the level of the precipitating bath is best. The smaller values will be availed of when the surface of the precipitation bath is practically calm and the greater distances will be used when the surface of the precipitating bath is not quite so calm. If the stretch of air is too large the film issuing from the slit contracts towards the center, and in addition an accumulation of material takes place at both sides of the film, which produces a thickening of the film at the edges.

The free bath passage is best chosen at a length of about 10 to 20 cm. By this means the coagulation takes place at both sides of the film. Too long a free precipitating bath passage is to be avoided on account of the transverse shrinkage setting in when the film solidifies into a film.

The drum, onto which the film or band is allowed to run after passing through the free stretch of bath, is made comparatively large, for the greater the circumference of the drum, the smaller the angular speed of the drum is able to be kept. Drums of a diameter of 80 cm. are adequate. It is, however, preferable to use drums of a diameter of 1 meter or more.

The transverse shrinkage of the film is prevented extensively by the drum. This is due to the fact that the film, owing to adhesion, adheres firmly to the surface of the drum. By utilizing the known endless press-on bands or by other devices opposing the transverse shrinkage of the film the effect of the adhesion force can be still considerably increased.

An appreciable transverse shrinkage of the film takes place not only directly after the pouring but also on entrance of the film into the first acid bath. It is, therefore, advisable to provide also in such bath a drum with a comparatively large circumference, which can also be used in combination with endless press-on bands in the same manner as the first large drum. The diameter of the usual transport rollers, with which the film is transported, preferably in an up and down direction, through the various after-treatment baths, is of relatively small importance, even though it is also advisable not to make the diameter of these too small. Of great importance, however, are the dimensions of the just described two drums, the one arranged directly after the pourer and the other at the entrance of the film into the first acid bath, because on these two places the symptoms of transverse shrinkage are particularly great.

Inter alia a composition of 7.2% cellulose, 7% ammonia and 3.5% copper can be used as the copper-containing spinning solution.

The drawing shows diagrammatically a device adapted for the production of films according to the invention. The spinning solution of a composition just described is squirted by air pressure or suitable pumps in the manner well known in the production of viscose films out of a slot of a pouring device or hopper $a$ which is adjusted to a width of 0.15 mm.

The nap thus formed is however not introduced directly into the coagulating liquid but first passes through a stretch of air $b$ of 5 mm. Hereupon it enters a coagulating bath $c$ consisting of 4.5% soda lye. The nap is conducted through the free 16 cm. long bath stretch $d$ and thus coagulated from both sides. The pre-coagulated film is then allowed to run on the drum $e$ having a diameter of 1 meter. The outside edges of the film lying on the drum are pressed on to the drum by the press-on bands $f$, so that a transverse shrinkage of the film during the first steps of coagulation is avoided. The film is then released from the drum and is conducted further through the coagulation bath coil-wise over rollers $g$ each of a diameter of 10 cm. These rollers $g$, in cooperation with the drum $e$, and if desired also the subsequent guiding and advancing rollers, effect the longitudinal stretching above referred to, whereby the film ultimately attains the desired degree of fineness. Thereupon follows an aftertreatment with pure water in the trough $h$ and an acidifying treatment in trough $i$ to remove copper and other impurities. The tank $i$ contains 10% solution of sulphuric acid. As the film in the acid treatment also has a strong tendency to shrink, care is taken according to the invention to prevent such shrinking. This is done by conducting the film once more over a drum $k$ having a large diameter, so that a strong adhesive action is produced between the film and the supporting base. The drum $k$ has a diameter of 1 meter and is equipped with press-on bands $m$ in the same manner as drum $e$. After being released from this drum $k$ the film is further conducted through the acid bath by the small rollers $n$, then through a water bath $o$ and hereupon passed into a glycerine (softening) bath and then to a drying apparatus and a cutting device. As the appliances for these last-mentioned operations are well known to those skilled in the art a more detailed description is unnecessary.

By this means it is possible to produce extremely thin cellulose hydrate films as clear as glass with a weight of less than 15 grams per square meter. It is even possible with the greatest ease to make such films of merely 10, 8, 6 and even 5 grams in weight per square meter. Such thin structures manufactured from copper-containing cellulose solution and precipitated in soda lye have quite a peculiar character. They are absolutely transparent, and their presence in single film form is scarcely perceptible to the eye in certain positions. The structures have lost the glass-like, brittle nature of known films. The foils are as extremely pliant as gold leaf; they are, therefore, especially suitable for covering various objects even objects having uneven surfaces. With their unsurpassed fineness, pliability and great plasticity the foils are capable of adapting themselves to and fitting all unevennesses.

Their extremely low weight, their toughness and comparatively great resistance make them ideally suited for covering and packing small objects with great surface, especially when a packing material is required that does not appreciably increase the weight of the package.

The foils can be crumpled by hand or by machine in operations and made completely smooth again. Whole foils or strips can be knotted like threads, the knots undone and the foils or strips then smoothed again.

In speaking of a foil which is clear as glass, we mean a product consisting of regenerated cellulose without bubbles, stripes and other internal structural irregularities. It is, however possible, for example by suitable additions, such as finely ground inorganic pigments, to deprive the foil of its character of being clear as glass, to make it non-transparent or opaque, or it may be dyed, either by subsequent treatment or by adding corresponding substances directly to the spinning material.

We claim:

1. A process for the production of fine foils consisting of regenerated cellulose, comprising the steps of squirting a cuprammonium cellulose solution through a narrow slit, conducting the film so formed under tension through a free stretch of air of 10 mm. at the most wherein both sides of the film are exposed to the atmosphere, introducing the film into a coagulating bath of diluted soda lye, conducting the film under tension through a short free bath passage in which both sides of the film are exposed to the bath liquid, running the film onto a relatively large drum under tension, passing the pre-coagulated film through the coagulating bath while avoiding transverse shrinkage, and after-treating the film with washing and acidifying baths and then drying the same, the stretching being of such a degree that a film of a maximum weight of about 15 gms./sq. m. is obtained.

2. A process according to claim 1, in which the free bath passage between the surface of the bath and the run-on place on the guiding drum is 20 cm. at the most.

3. A process for the production of thin foils consisting of regenerated cellulose, comprising the step of squirting a cuprammonium cellulose solution through a narrow slit, conducting the film so formed under tension through a free stretch of air of 10 mm. at the most wherein both sides of the film are exposed to the atmosphere, conducting the film under tension into a coagulating bath containing diluted soda lye and allowing the lye to act from both sides on the film conducted through the bath over a stretch of 20 cm. at the most to subject the film to a preliminary coagulation, passing the pre-coagulated product through the coagulating bath while avoiding transverse shrinkage, conducting the film under tension through an after-treatment bath also while avoiding transverse shrinkage, and then washing, softening, and drying the product, the stretching being of such a degree that a film of a maximum weight of about 15 gms./sq. m. is obtained.

4. A process according to claim 3, in which the film is stretched immediately after its formation and before complete coagulation has taken place to reduce the thickness of the film.

5. In the manufacture of thin films from cuprammonium cellulose solution according to the wet spinning process, the steps which comprise squirting the solution through a slit of less than 0.5 mm. width of slit, conducting the film so formed under tension through a free stretch of air of less than 10 mm. and through a free bath passage of less than 20 cm., both sides of the film being thus equally exposed to the atmosphere and to the bath liquid, stretching the pre-formed film on the free section and avoiding the transverse shrinkage both in the precipitating bath and in the acidifying bath by using at least two guide drums with large diameter, the stretching being of such a degree that a film of a maximum weight of about 15 gms./sq. m. is obtained.

6. In the manufacture of thin films according to claim 5, the step of avoiding transverse shrinkage by strengthening the adhesive force between the film and the guide drums used in the coagulating bath and in the acidifying bath.

7. A process for the manufacture of fine cellulosic films, which comprises squirting a cuprammonium cellulose solution through a narrow slit, directing the extruded film under tension upon a supporting surface positioned within an alkaline coagulating bath, the distance between the point of extrusion and the point of engagement of the film with the supporting surface in the bath being such that the film travels unsupported through a free path and is hardened to equal degrees on both surfaces thereof to such an extent that when it engages the supporting surface it possesses sufficient adhesion to cling to such surface and resist transverse shrinkage, but yet does not adhere so tenaciously to the surface as to cause difficulty in removal therefrom, and subjecting the extruded film to such a degree of tension that the hardened film has a maximum weight of about 15 gms./sq. m.

8. A process for the production of fine foils consisting of cellulose hydrate, comprising the steps of squirting a copper oxide ammonia cellulose solution through a narrow slit, conducting the film so formed under tension through a short free stretch of air wherein both sides of the film are exposed to the atmosphere, introducing the film into a bath containing diluted soda lye, conducting the film through the coagulating bath, running such film onto a relatively large drum under transverse tension and simultaneously stretching the film longitudinally to such an extent that a film is obtained having a maximum weight of about 15 gms./sq. m., passing the coagulated product through washing and acidifying baths, and then directing the product into a drying apparatus in continuous operation.

9. A process according to claim 8, in which the free stretch of air is less than 10 mm. long.

10. A process according to claim 8, wherein the film extruded through the slit has a thickness of less than 0.5 mm.

11. A process according to claim 8, in which the film, after the stretching, is passed through a softening bath before it is conducted to the drying apparatus.

RUDOLF ETZKORN.
EWALD KNEHE.